(12) United States Patent
Sedukhin et al.

(10) Patent No.: US 8,230,386 B2
(45) Date of Patent: Jul. 24, 2012

(54) MONITORING DISTRIBUTED APPLICATIONS

(75) Inventors: Igor Sedukhin, Issaquah, WA (US); Gueorgui Bonov Chkodrov, Redmond, WA (US); Amol Sudhakar Kulkarni, Bothell, WA (US); Mariusz Gerard Borsa, Redmond, WA (US); Haoran Andy Wu, Sammamish, WA (US); Daniel Eshner, Issaquah, WA (US); Gilles C. J. A. Zunino, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1097 days.

(21) Appl. No.: 11/844,177

(22) Filed: Aug. 23, 2007

(65) Prior Publication Data

US 2009/0055838 A1    Feb. 26, 2009

(51) Int. Cl.
G06F 9/44    (2006.01)

(52) U.S. Cl. ........ 717/104; 717/100; 717/101; 717/114; 717/117; 719/318

(58) Field of Classification Search .................. None
See application file for complete search history.

(56) References Cited

U.S. PATENT DOCUMENTS

| | | |
|---|---|---|
| 4,751,635 A | 6/1988 | Kret |
| 5,423,003 A | 6/1995 | Berteau |
| 5,602,991 A | 2/1997 | Berteau |
| 5,655,081 A | 8/1997 | Bonnell et al. |
| 5,764,241 A | 6/1998 | Elliott et al. |
| 5,809,266 A | 9/1998 | Touma |
| 5,893,083 A | 4/1999 | Eshghi et al. |
| 5,913,062 A | 6/1999 | Vrvilo et al. |
| 5,937,388 A | 8/1999 | Davis et al. |
| 5,958,010 A | 9/1999 | Agarwal |
| 6,005,849 A | 12/1999 | Roach et al. |
| 6,026,404 A | 2/2000 | Adunuthula |
| 6,055,363 A | 4/2000 | Beals et al. |
| 6,070,190 A | 5/2000 | Reps et al. |
| 6,167,538 A | 12/2000 | Neufeld et al. |
| 6,185,601 B1 | 2/2001 | Wolff |
| 6,225,995 B1 | 5/2001 | Jacobs |
| 6,230,309 B1 | 5/2001 | Turner |
| 6,247,056 B1 | 6/2001 | Chou |
| 6,263,339 B1 | 7/2001 | Hirsch |
| 6,279,009 B1 | 8/2001 | Smirnov et al. |

(Continued)

FOREIGN PATENT DOCUMENTS

EP    0733967    9/1996

(Continued)

OTHER PUBLICATIONS

U.S. Appl. No. 11/925,326, Mail Date Jul. 22, 2010, Notice of Allowance.

(Continued)

Primary Examiner — Qing Wu
(74) Attorney, Agent, or Firm — Workman Nydegger

(57) ABSTRACT

The present invention extends to methods, systems, and computer program products for monitoring distributed applications. Declarative application models are used. Operational data for a deployed application can be compared to an application intent expressed in a corresponding declarative application to provide more effective monitoring of application behavior. Application components can subscribe to an event fabric to receive configurations that indicate what events the application is to emit (i.e., publish into the event fabric) for monitoring. Thus, applications essentially subscribe to produce information (as opposed to subscribing to receive information). Monitoring can be dynamically adjusted in response to environment changes.

18 Claims, 8 Drawing Sheets

U.S. PATENT DOCUMENTS

| | | |
|---|---|---|
| 6,327,622 B1 | 12/2001 | Jindal |
| 6,330,717 B1 | 12/2001 | Raverdy |
| 6,334,114 B1 | 12/2001 | Jacobs |
| 6,336,217 B1 | 1/2002 | D'Anjou et al. |
| 6,342,907 B1 | 1/2002 | Petty |
| 6,415,297 B1 | 7/2002 | Leymann et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Keller et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown |
| 7,072,934 B2 | 7/2006 | Helgeson |
| 7,079,010 B2 | 7/2006 | Champlin |
| 7,085,837 B2 | 8/2006 | Kimbrel |
| 7,096,258 B2 | 8/2006 | Hunt |
| 7,103,874 B2 | 9/2006 | McCollum |
| 7,130,881 B2 | 10/2006 | Volkov et al. |
| 7,150,015 B2 | 12/2006 | Pace et al. |
| 7,155,380 B2 | 12/2006 | Hunt |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,210,143 B2 | 4/2007 | Or et al. |
| 7,219,351 B2 | 5/2007 | Bussler et al. |
| 7,263,689 B1 | 8/2007 | Edwards et al. |
| 7,296,268 B2 | 11/2007 | Darling |
| 7,379,999 B1 | 5/2008 | Zhou et al. |
| 7,383,277 B2 | 6/2008 | Gebhard et al. |
| 7,395,526 B2 | 7/2008 | Arcand |
| 7,403,956 B2 | 7/2008 | Vaschilo et al. |
| 7,444,618 B2 | 10/2008 | Kulkarni et al. |
| 7,487,080 B1 | 2/2009 | Tocci |
| 7,512,707 B1 | 3/2009 | Manapragada |
| 7,526,734 B2 | 4/2009 | Vasilev |
| 7,703,075 B2 | 4/2010 | Das |
| 7,747,985 B2 | 6/2010 | Campbell et al. |
| 7,761,844 B2 | 7/2010 | Bove |
| 7,774,744 B2 | 8/2010 | Moore et al. |
| 7,796,520 B2 | 9/2010 | Poustchi |
| 7,797,289 B2 | 9/2010 | Chan et al. |
| 7,844,942 B2 | 11/2010 | Eilam |
| 7,890,543 B2 | 2/2011 | Hunt et al. |
| 8,122,106 B2 | 2/2012 | Hunt et al. |
| 2002/0035593 A1 | 3/2002 | Salim et al. |
| 2002/0038217 A1 | 3/2002 | Young |
| 2002/0099818 A1 | 7/2002 | Russell |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 | 9/2002 | Deosaran |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman et al. |
| 2003/0182656 A1 | 9/2003 | Leathers |
| 2003/0195763 A1 | 10/2003 | Gulcu |
| 2003/0208743 A1 | 11/2003 | Chong |
| 2004/0034850 A1 | 2/2004 | Burkhardt |
| 2004/0040015 A1 | 2/2004 | Jordan |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi |
| 2004/0186905 A1 | 9/2004 | Young |
| 2004/0249972 A1 | 12/2004 | White |
| 2005/0005200 A1 | 1/2005 | Matena et al. |
| 2005/0010504 A1 | 1/2005 | Gebhard et al. |
| 2005/0011214 A1 | 2/2005 | Schwetfuehrer |
| 2005/0055692 A1 | 3/2005 | Lupini |
| 2005/0071737 A1 | 3/2005 | Adendorff |
| 2005/0074003 A1 | 4/2005 | Ball |
| 2005/0091227 A1 | 4/2005 | McCollum et al. |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0149940 A1 | 7/2005 | Calinescu |
| 2005/0155042 A1 | 7/2005 | Kolb et al. |
| 2005/0165906 A1 | 7/2005 | Deo et al. |
| 2005/0182750 A1 | 8/2005 | Krishna et al. |
| 2005/0188075 A1 | 8/2005 | Dias |
| 2005/0216831 A1 | 9/2005 | Guzik |
| 2005/0228855 A1 | 10/2005 | Kawato |
| 2005/0246656 A1 | 11/2005 | Vasilev |
| 2005/0251546 A1 | 11/2005 | Pichetti et al. |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng |
| 2006/0064460 A1 | 3/2006 | Sugawara |
| 2006/0070066 A1 | 3/2006 | Grobman |
| 2006/0070086 A1 | 3/2006 | Wang |
| 2006/0074730 A1 | 4/2006 | Shukla et al. |
| 2006/0074734 A1 | 4/2006 | Shukla |
| 2006/0080352 A1 | 4/2006 | Boubez |
| 2006/0095443 A1 | 5/2006 | Kumar |
| 2006/0101059 A1 | 5/2006 | Mizote |
| 2006/0123389 A1 | 6/2006 | Kolawa et al. |
| 2006/0123412 A1 | 6/2006 | Hunt |
| 2006/0155738 A1 | 7/2006 | Baldwin et al. |
| 2006/0161862 A1 | 7/2006 | Racovolis et al. |
| 2006/0173906 A1 | 8/2006 | Chu et al. |
| 2006/0206537 A1 | 9/2006 | Chiang |
| 2006/0206890 A1 | 9/2006 | Shenfield et al. |
| 2006/0230314 A1 | 10/2006 | Sanjar |
| 2006/0235859 A1 | 10/2006 | Hardwick |
| 2006/0236254 A1 | 10/2006 | Mateescu |
| 2006/0242195 A1 | 10/2006 | Bove |
| 2006/0265231 A1 | 11/2006 | Fusaro et al. |
| 2006/0277323 A1 | 12/2006 | Joublin |
| 2006/0277437 A1 | 12/2006 | Ohtsuka |
| 2006/0294502 A1 | 12/2006 | Das |
| 2006/0294506 A1 | 12/2006 | Dengler |
| 2007/0005283 A1 | 1/2007 | Blouin |
| 2007/0005299 A1 | 1/2007 | Haggerty et al. |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0038994 A1 | 2/2007 | Davis et al. |
| 2007/0050237 A1 | 3/2007 | Tien |
| 2007/0050483 A1 | 3/2007 | Bauer et al. |
| 2007/0061775 A1 | 3/2007 | Tanaka |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 | 5/2007 | Dublish |

| | | |
|---|---|---|
| 2007/0168924 A1 | 7/2007 | Kirby |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari |
| 2007/0226681 A1 | 9/2007 | Thorup |
| 2007/0233879 A1 | 10/2007 | Woods |
| 2007/0244904 A1 | 10/2007 | Durski |
| 2007/0245004 A1 | 10/2007 | Chess |
| 2007/0277109 A1 | 11/2007 | Chen |
| 2007/0283344 A1 | 12/2007 | Apte et al. |
| 2007/0288885 A1 | 12/2007 | Brunel et al. |
| 2007/0294364 A1 | 12/2007 | Mohindra et al. |
| 2008/0005729 A1 | 1/2008 | Harvey |
| 2008/0010631 A1 | 1/2008 | Harvey |
| 2008/0127052 A1 | 5/2008 | Rostoker |
| 2008/0209414 A1 | 8/2008 | Stein |
| 2008/0244423 A1 | 10/2008 | Jensen-Pistorius |
| 2009/0049165 A1 | 2/2009 | Long et al. |
| 2009/0187662 A1 | 7/2009 | Manapragada |
| 2009/0265458 A1 | 10/2009 | Baker |
| 2010/0005527 A1 | 1/2010 | Jeon |
| 2011/0179151 A1 | 7/2011 | Sedukhin |
| 2011/0219383 A1 | 9/2011 | Bhasakar |
| 2012/0042305 A1 | 2/2012 | Sedukhin |

FOREIGN PATENT DOCUMENTS

| | | |
|---|---|---|
| EP | 1770510 | 4/2007 |
| WO | WO 00/38091 | 6/2000 |
| WO | 0124003 | 4/2001 |
| WO | WO 02/27426 A2 | 4/2002 |
| WO | 2007072501 | 6/2007 |

OTHER PUBLICATIONS

U.S. Appl. No. 11/740,737, filed Apr. 26, 2007, Sedhukin.
U.S. Appl. No. 11/771,827, filed Jun. 29, 2007, Sedhukin.
U.S. Appl. No. 11/771,816, filed Jun. 29, 2007, Sedhukin.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pags. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pags. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, Inria, France, [online] [retrieved on Apr. 20, 2007], 15 pages. Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platfom", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar EL, et al., "Model Driven Provisionings: Bridging the Gap Between Declarative Object Models and Procedural Provisioning Tools", http://wcl.cs.rpi.edu/papers/middleware06.pdf.
U.S. Appl. No. 12/105,083, filed Apr. 17, 2008.
Office Action dated Mar. 2, 2010 cited in U.S. Appl. No. 11/771,816.
Office Action dated Mar. 18, 2010 cited in U.S. Appl. No. 11/740,737.
U.S. Appl. No. 11/925,079, Mail Date Mar. 1, 2011, Notice of Allowance.
Office Action dated Apr. 5, 2010 cited in U.S. Appl. No. 11/771,827.
Office Action dated Apr. 13, 210 cited in U.S. Appl. No. 11/925,326.
U.S. Appl. No. 11/925,184, Mail Date Apr. 25, 2011, Office Action.
U.S. Appl. No. 11/740,737, Mail Date Apr. 29, 2011, Notice of Allowance.
Quentin Limbourg et al: "USIXML: A Language Supporting Multi-path Development of User Interfaces", Engineering Human Computer Interaction and interactive Systems; [Lecture Notes in Computer Science;;LNCS], Springer-Verlag, Berlin/Heidelberg, vol. 3425, Jun. 30, 2005 pp. 200-220, CP019009959 ISBN: 978-3-540-26097-4.
Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.
Wang L J et al: "Abstract Interface Specification Languages for device-independent Interface Design: Classification, Analysis and Challenges", Pervasive Computing and Applications, 2006 1st International Symposium on, IEEE, PI, Aug. 1, 2006, pp. 241-246.
Jean Vanderdonckt ed—Oscar Pastor et al, "A MDA-Compliant Environment for Developing User Interfaces of information Systems", Advanced Information Systems Engineering; [Lecture Notes in Computer Science;;LNCS], Springer-Verlag, Berling, Berlin/Heidelberg, vol. 3520, May 17, 2005, pp. 16-31.
Xiaofeng Yu et al., "Towards a Model Driven Approach to Automatic BPEL Generation", Model Driven Architecture Foundations and Applications; [Lecture Notes in Computer Science;;LNCS], Springer Berlin Heidelberg, vol. 4530, Jun. 11, 2007 pp. 204-218.
U.S. Appl. No. 11/925,079, Mail Date Sep. 1, 2010, Office Action.
U.S. Appl. No. 11/740,737, Mail Date Sep. 13, 2010, Office Action.
U.S. Appl. No. 11/925,079, filed Oct. 26, 2007, Bhaskar.
U.S. Appl. No. 11/925,326, filed Oct. 26, 2007, Christensen.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
OSLO>Suite 2006, "OSLO Suite is the leading platform for designing, building and executing adaptive business solutions", http://www.oslo-software.com/en/product.php.
Korb, John T., et al., "Command Execution in a Heterogeneous Environment", 1986 ACM, pp. 68-74.

Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
Office Action dated Sep. 14, 2009 cited in U.S. Appl. No. 11/740,737.
Office Action dated Oct. 14, 2009 cited in U.S. Appl. No. 11/771,827.
Office Action dated Oct. 1, 2009 cited in U.S. Appl. No. 11/771,816.
Nastel Technologies, Inc., "AutoPilot Business Dashboard Configuration and User's Guide Version 4.4", 2006, AP/DSB 440.001, 82 pages.
TIBCO The Power of Now, "TIBCO BusinessFactor", 2006, 2 pages.
TIBCO, http://www.tibco.com/software/business_activity_monitoring/businessfactor/default.jsp, Copyright 2000-2007, 2 pages.
"Factal:Edge Enlists CMLgroup to Bring Visualization to Business Performance Management Clients", http://extranet.fractaledge.com/News/PressReleases/2006/060829, 2006, 2 pages.

Shaojie Wang, Synthesizing Operating System Based Device Drivers in Embedded Systems, 2003.
U.S. Appl. No. 11/771,827, Mail Date Nov. 29, 2010, Notice of Allowance.
U.S. Appl. No. 11/925,067, Mail Date Dec. 6, 2010, Notice of Allowance.
Rosenblum, D., and Wolf, A. "A Design Framework for Internet-Scale Event Observation and Notification," ACM SIGSOFT Software Engineering Notes. vol. 22, Issue 6, Nov. 1997. [retrieved on Jun. 12, 2011]. Retrieved from the Internet: <URL:www.acm.org>.
D. Raymar et al.; End-to-End Model Driven Policy Based Network Management; 2006-computer.org; pp. 1-4.
R.M. Argent et al.; Development of Multi-Framework Model Components; 2004; Citeseer; pp. 1-6.
U.S. Appl. No. 11/925,680, Mail Date Jul. 18, 2011, Office Action.
U.S. Appl. No. 11/925,591, Mail Date Jul. 5, 2011, Office Action.
U.S. Appl. No. 13/077,730, Mail Date Jul. 14, 2011, Office Action.
U.S. Appl. No. 11/925,201, Mail Date Jul. 19, 2011, Notice of Allowance.
Wikipedia, "Declarative Programming", available at wikipedia.org/w/index/php?title=Declarative_Programming&oldid=1645216, Last accessed Jul. 28, 2011, (3 pages).
Notice of Allowance dated Sep. 30, 2011 cited in U.S. Appl. No. 11/925,201.
Notice of Allowance dated Sep. 29, 2011 cited in U.S. Appl. No. 13/077,730.
Office Action dated Oct. 19, 2011 cited in U.S. Appl. No. 11/925,680.
U.S. Appl. No. 11/925,184, Mail Date Jan. 14, 2011, Office Action.
Rowe, L.A., et al., "Automating the Selection of Implementation Structures," IEEE Transactions on Software Engineering, Nov. 1978, pp. 494-506, [retrieved on Jan. 6, 2012], Retrieved from the internet: <URL:http://ieeexplore.ieee.org/>.
Oberle, D., et al., "Developing and Managing Software Components in an Ontology-Based Application Server," Proceedings of the 5th ACM/IFIP/USENIX international conference on Middleware, Oct. 2004, pp. 459-477, [retrieved on Jan. 6, 2012], Retrieved from the Internet: <URL:http://dl.acm.org/>.
Notice of Allowance dated Jan. 17, 2012 cited in U.S. Appl. No. 11/925,591.
Office Action dated Jan. 3, 2012 cited in U.S. Appl. No. 13/110,223.
Ketfi A., et al., "Model-Driven framework for Dynamic Deployment and Reconfiguration of Component-Based Software Systems", Metainformatics Symposium, Nov. 9-11, 2005, 9 pages, [retrived on Mar. 6, 2012], retrived from the Internet: <URL:http://dl.amc.org/>.
Eastman, J., et al., "Service Lifecycle in a Distributed Computing Environment", IEEE, 1998, pp. 183-184, [retrieved on Mar. 6, 2012], Retrieved from the Internet: <URL:http://ieeexplore.ieee.org/>.
U.S. Appl. No. 11/925,680, filed Mar. 14, 2012, Notice of Allowance.
U.S. Appl. No. 11/771,816, filed Apr. 10, 2012, Notice of Allowance.

MONITORING DISTRIBUTED APPLICATIONS

CROSS-REFERENCE TO RELATED APPLICATIONS

N/A.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a network or tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different computer systems. One can appreciate, therefore, that while this ability to combine processing power through several different computer systems can be an advantage, there are various complexities associated with distributing application program modules. For example, a distributed application server may need to run distributed applications optimally on the available resources, and take into account changing demand patterns and resource availability.

Unfortunately, conventional distributed application servers are typically ill-equipped (or not equipped at all) to automatically handle and manage all of the different complexities associated with distributed application. For example, an organization may have an online store application program that is routinely swamped with orders whenever there is a promotion, or during the same holidays each year. As such, the organization may expect the distributed application server to analyze and anticipate these fluctuating demands on various components or modules of the given distributed application program.

In particular, the organization might expect the distributed application server to swap around various resources so that high-demand processes can be handled by software and hardware components on other systems that may be less busy. Such accommodations, however, can be difficult if not impossible to do with conventional distributed application server platforms. Specifically, most conventional distributed application server platforms are ill-equipped or otherwise unable to identify and properly manage different demand patterns between components of a distributed application program. This is due at least partly to the complexity in managing application programs that can have many distributed components and subsystems, many of which are long-running workflows, and/or otherwise legacy or external systems.

In addition, conventional distributed application program servers are generally not configured for efficient scalability. For example, most distributed application servers are configured to manage precise instructions of the given distributed application program, such as precise reference and/or component addressing schemes. That is, there is a relatively tight coupling between components of an application program. As such, when an administrator desires to redeploy certain modules or components onto another server or set of computer systems, there is always some (and potentially a significant) possibility of redeployment causing errors to occur (e.g., due to differences in network protocols, system configurations, etc.) These errors can result when messages are not passed onward everywhere they are needed, or if they are passed onward incorrectly.

In many environments a distributed application server manages several different distributed applications, each of which executes on a different platform. Thus, the distributed application server may need to translate different instructions for each different platform before the corresponding distributed application program may be able to accept and implement the change. Due to these and other complexities, distributed application programs tend to be fairly sensitive to sharply increasing demands (i.e., demand spikes).

For example, sharply increasing demands can cause various distributed application modules to operate at a sub-optimum level for significant periods of time before the sub-optimum performance is detected. In some cases, an administrator (depending on skill and experience) may not even attempt corrective action, since improperly implemented corrective action can cause further operational problems. Thus, a distributed application module could potentially become stuck in a pattern of inefficient operation, such as continually rebooting itself, without ever getting corrected during the lifetime of the distributed application program.

Various techniques for automated monitoring of distributed applications have been used to reduce, at least to some extent, the level of human interaction that is required to fix undesirable distributed application behaviors. However, these monitoring techniques suffer from a variety of inefficiencies.

For example, to monitor a distributed application, the distributed application typically has to be instrumented to produce events. During execution the distributed application produces the events that are sent to a monitor module. The monitor module then uses the events to diagnose and potentially correct undesirable distributed application behavior. Unfortunately, since the instrumentation code is essentially built into the distributed application there is little, if any, mechanism that can be used to regulate the type, frequency, and contents of produced events. As such, producing monitoring events is typically an all or none operation.

As a result of the inability to regulate produced monitoring events, there is typically no way during execution of distributed application to adjust produced monitoring events (e.g., event types, frequencies, and content) for a particular purpose. Thus, it can be difficult to dynamically configure a distributed application to produce monitoring events in a manner that assists in monitoring and correcting a specific undesirable application behavior. Further, the monitoring system itself, through the unregulated production of monitoring events, can aggravate or compound existing distributed application problems. For example, the production of monitoring events can consume significant resources at worker machines and can place more messages on connections that are already operating near capacity.

Some monitoring modules can filter out unneeded monitoring events when the monitoring events are received at the monitoring module. However, monitoring modules typically lack any ability to alter distributed application configuration, at least due to the instrumentation code being built into the distributed application. Thus, filtering typically occurs near the end of the monitoring process and can not be used to reduce the consumption of worker machine resources and/or network capacity associated with the production of monitoring events.

Additionally, when source code for a distributed application is compiled (or otherwise converted to machine-readable code), a majority of the operating intent of the distributed application is lost. Thus, a monitoring module has limited, if any, knowledge, of the intended operating behavior of a distributed application when it monitors the distributed application. Accordingly, during distributed application execution, it is often difficult for a monitoring module to determine if undesirable behavior is in fact occurring.

The monitoring module can attempt to infer intent from received monitoring events. However, this provides the monitoring module with limited and often incomplete knowledge of the intended application behavior. For example, it may be that an application is producing seven messages a second but that the intended behavior is to produce only five messages a second. However, based on information from received monitoring events, it can be difficult, if not impossible, for a monitor module to determine that the production of seven messages a second is not intended.

BRIEF SUMMARY

The present invention extends to methods, systems, and computer program products for monitoring distributed applications. In some monitoring embodiments, a computer system accesses a declarative application model describing application intent. The declarative application model indicates events that are to be emitted from applications deployed in accordance with the application intent. An application is deployed in accordance with the declarative application model. The computer system accesses a declarative observation model. The declarative observation model describes how emitted events, received from an application deployed in accordance with the application intent, are to be aggregated and processed to produce relevant operational data for the application The declarative application model and the declarative observation model are compiled into an event flow graph for monitoring the behavior of the application. The event flow graph includes connected event streams and event operators indicating how to process received events to create operational data for the application. The application event is activated based on the event flow graph. The application event flow is for receiving and processing emitted events associated with the application to create operation data for the application.

An event associated with the deployed application is received. The received event is processed in accordance with the activated application event flow to create operational data for the deployed application. The operational data is stored for use in making subsequent decisions related to the behavior of the deployed model based application.

In other monitoring embodiments, a deployed model based application subscribes to a monitoring configuration topic within a publish/subscribe event fabric. The monitoring configuration topic corresponds to monitoring configurations that can cause the deployed model based application to begin emitting events. Accordingly, the deployed model based application essentially subscribes to determine when and what information should be published to the application event topic within the publish/subscribe event fabric.

An event dispatcher subscribes to an application event topic within the publish/subscribe event fabric. A monitoring configuration is published to the monitoring configuration topic. The monitoring configuration indicates that one or more events are to be published to the application even topic within the publish/subscribe event fabric. The monitoring configuration is delivered to the deployed model based application based on the deployed model based application having subscribed to the monitoring configuration topic. The deployed model based application is configured to publish the one or more events to the application event topic in response to receiving the published monitoring configuration.

The one or more events are published to the application event topic. The one or more events are delivered to the event dispatcher in response to receiving the one or more events and based on the event dispatcher having subscribed to the application event topic. Operational data is created from the one or more events. The operational data indicates the behavior of the deployed model based application. The operational data is stored for use in making subsequent decisions related to the behavior of the deployed model based application.

In further embodiments, monitoring of a distributed application is adjusted. An application is deployed in accordance with a declarative application model. The declarative application model and a declarative observation model are compiled into an application monitoring event flow graph. The application monitoring event flow graph includes connected event streams and event operators indicating how to process received events to create operational data for the application. A monitor monitoring event flow graph is added to the application monitoring event flow graph. The monitor monitoring event flow graph includes connected event streams and event operators indicating how to process events triggered by an active application event flow to create monitor operational data.

An application monitoring event flow is activated based on the application monitoring event flow graph. A monitor monitoring event flow is subsequently activated based on the activated application monitoring event flow. The monitor monitoring event flow is for receiving and processing emitted events associated with monitoring the application in order to create monitor operational data. An event associated with the deployed application is received. The received event is processed in accordance with the application monitoring event flow. Processing triggers events regarding the monitoring itself (such as when events are processed by event operators). The triggered event is processed in accordance with the monitor monitoring event flow to create monitor operational data. The configuration of the application monitoring event flow is adjusted for more efficient monitoring of the deployed application based on the monitoring operational data. Adjustments to the application monitoring event flow cause corresponding adjustments to the monitor monitoring event flow.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
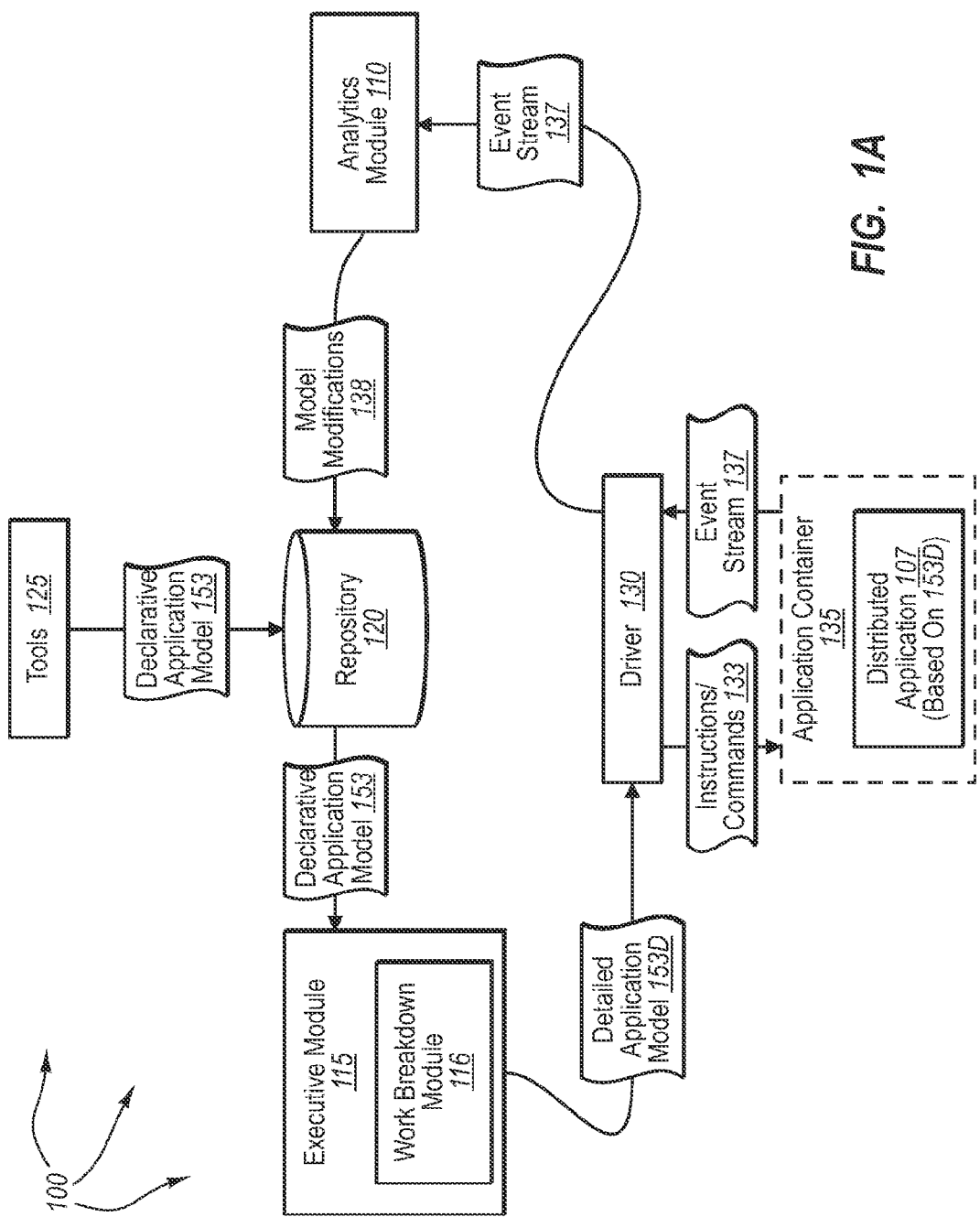
FIGS. 1A-1E illustrate different views of an example computer architecture that facilitates monitoring of modeled applications and adjusting the monitoring of modeled applications.

The present invention extends to methods, systems, and computer program products for monitoring distributed applications. In some monitoring embodiments, a computer system accesses a declarative application model describing application intent. The declarative application model indicates events that are to be emitted from applications deployed in accordance with the application intent. An application is deployed in accordance with the declarative application model. The computer system accesses a declarative observation model. The declarative observation model describes how emitted events, received from an application deployed in accordance with the application intent, are to be aggregated and processed to produce relevant operational data for the application The declarative application model and the declarative observation model are compiled into an event flow graph for monitoring the behavior of the application. The event flow graph includes connected event streams and event operators indicating how to process received events to create operational data for the application. The application event is activated based on the event flow graph. The application event flow is for receiving and processing emitted events associated with the application to create operation data for the application.

An event associated with the deployed application is received. The received event is processed in accordance with the activated application event flow to create operational data for the deployed application. The operational data is stored for use in making subsequent decisions related to the behavior of the deployed model based application.

In other monitoring embodiments, a deployed model based application subscribes to a monitoring configuration topic within a publish/subscribe event fabric. The monitoring configuration topic corresponds to monitoring configurations that can cause the deployed model based application to begin emitting events. Accordingly, the deployed model based application essentially subscribes to determine when and what information should be published to the application event topic within the publish/subscribe event fabric.

An event dispatcher subscribes to an application event topic within the publish/subscribe event fabric. A monitoring configuration is published to the monitoring configuration topic. The monitoring configuration indicates that one or more events are to be published to the application even topic within the publish/subscribe event fabric. The monitoring configuration is delivered to the deployed model based application based on the deployed model based application having subscribed to the monitoring configuration topic. The deployed model based application is configured to publish the one or more events to the application event topic in response to receiving the published monitoring configuration.

The one or more events are published to the application event topic. The one or more events are delivered to the event dispatcher in response to receiving the one or more events based on the event dispatcher having subscribed to the application event topic. Operational data is created from the one or more events. The operational data indicates the behavior of the deployed model based application. The operational data is stored for use in making subsequent decisions related to the behavior of the deployed model based application.

In further embodiments, monitoring of a distributed application is adjusted. An application is deployed in accordance with a declarative application model. The declarative application model and a declarative observation model are compiled into an application monitoring event flow graph. The application monitoring event flow graph includes connected event streams and event operators indicating how to process received events to create operational data for the application. A monitor monitoring event flow graph is added to the application monitoring event flow graph. The monitor monitoring event flow graph includes connected event streams and event operators indicating how to process events triggered by an active application event flow to create monitor operational data.

An application monitoring event flow is activated based on the application monitoring event flow graph. A monitor monitoring event flow is subsequently activated based on the activated application monitoring event flow. The monitor monitoring event flow is for receiving and processing emitted events associated with monitoring the application in order to create monitor operational data. An event associated with the deployed application is received. The received event is processed in accordance with the application monitoring event flow. Processing triggers events regarding the monitoring itself (such as when events are processed by event operators). The triggered event is processed in accordance with the monitor monitoring event flow to create monitor operational data. The configuration of the application monitoring event flow is adjusted for more efficient monitoring of the deployed application based on the monitoring operational data. Adjustments to the application monitoring event flow cause corresponding adjustments to the monitor monitoring event flow.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates monitoring distributed applications. Depicted in computer architecture 100 are tools 125, repository 120, executive module 115, driver 130, analytics module 110, and application container 135. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 125 can be used to write declarative models for applications and stored though declarative models, such as, for example, declarative application model 153, in repository 120. Declarative models are used to determine the structure and behavior of real-world running (deployed) applications. A declarative model is also used to determine what events are reported (emitted) from an application that is deployed based on the declarative model. Thus, a user (e.g., distributed application program developer) can use one or more of tools 125 to create declarative model 153.

Generally, declarative models include one or more sets of high-level instructions expressing application intent for a distributed application. Thus, the high-level instructions generally describe operations and/or behaviors of one or more modules in the distributed application program. However, the high-level instructions do not necessarily describe implementation steps required to deploy a distributed application having the particular operations/behaviors (although they can if appropriate). For example, a declarative model 153 can express the generalized intent of a workflow, including, for example, that a first and a second Web service be connected to one another. However, declarative model 153 does not necessarily describe how (e.g., protocol), when, where (e.g., URI endpoint), etc., the first and second Web service are to be connected to one another.

To deploy an application based on a declarative model, the declarative model can be sent to executive module 115. Executive module 115 can refine the declarative model until there are no ambiguities and the details are sufficient for drivers to consume. Thus, executive module 115 can receive and refine declarative model 153 so that declarative model 153 can be translated by driver 130 (e.g., platform-specific driver) into a deployed application.

In general, "refining" a declarative model can include some type of work breakdown structure, such as, for example, progressive elaboration, so that the declarative model instructions are sufficiently complete for translation by driver 130. Since declarative models can be written relatively loosely by a human user (i.e., containing generalized intent instructions or requests), there may be different degrees or extents to which executive module 115 modifies or supplements a declarative model for deploying an application. Work breakdown module 116 can implement a weak breakdown structure algorithm, such as, for example, a progressive elaboration algorithm, to determine when an appropriate granularity has been reached and instructions are sufficient for driver 130.

Executive module 115 can also account for dependencies and constraints included in a declarative model. For example, executive module 115 can be configured to refine declarative model 153 based on semantics of dependencies between elements in the declarative model 153 (e.g., one web service connected to another). Thus, executive module 115 and work breakdown module 116 can interoperate to output detailed application model 153D that provides driver 130 with sufficient information to deploy distributed application 107.

In additional or alternative implementations, executive module 115 can also be configured to refine the declarative model 153 for some other contextual awareness. For example, executive module 115 can refine information about the inventory of application containers 135 that may be available in the datacenter where a distributed application program will be deployed. Executive module 115 can reflect contextual awareness information in detailed application model 153D.

In addition, executive module 115 can be configured to fill in missing data regarding computer system assignments. For example, executive module 115 might identify a number of different distributed application program modules in declarative model 153 that have no requirement for specific computer system addresses or operating requirements. Thus, executive module 115 can assign distributed application program modules to an available application container on a computer system. Executive module 115 can reason about the best way to fill in data in a refined declarative model 153. For example, as previously described, executive component 115 may determine and decide which transport to use for an endpoint based on proximity of connection, or determine and decide how to allocate distributed application program modules based on factors appropriate for handling expected spikes in demand. Executive module 115 can then record missing data in detailed declarative model 153D (or segment thereof).

In addition or alternative implementations, executive module 115 can be configured to compute dependent data in the declarative model 153. For example, executive module 115 can compute dependent data based on an assignment of distributed application program modules to application containers on computer systems. Thus, executive module 115 can calculate URI addresses on the endpoints, and propagate the corresponding URI addresses from provider endpoints to consumer endpoints. In addition, executive module 115 may evaluate constraints in the declarative model 153. For example, the executive component 115 can be configured to check to see if two distributed application program modules can actually be assigned to the same machine, and if not, executive module 115 can refine detailed declarative model 153D to accommodate this requirement.

After adding all appropriate data (or otherwise modifying/refining) to declarative model 153 (to create detailed application model 153D), executive component 115 can finalize the refined detailed application model 153D so that it can be translated by platform-specific drivers 130. To finalize or complete the detailed application model 153D, executive module 115 can, for example, partition a declarative application model into segments that can be targeted by any one or more platform-specific drivers. Thus, executive module 115 can tag each declarative application model (or segment thereof) with its target driver (e.g., the address of platform-specific driver 130). Furthermore, executive module 115 can verify that a detailed application model (e.g., 153D) can actually be translated by a platform-specific drivers, and, if so, pass the detailed application (or segment thereof) to the particular platform-specific driver 130 for translation.

Driver 130 translates detailed application module 153D into one or more (e.g., platform-specific) instructions/commands 133. As depicted in FIG. 1A, instructions/commands 133 can be used to deploy distributed application 107 in application container 135. Generally, application container 135 is configured to express the intent of a declarative model by executing the instructions/commands that were generated from the declarative model. Thus, the generalized intent of declarative application model 135, as refined by executive module 115 and implemented by driver 130, is expressed in distributed application 107. For example, when the general intent of declarative model 153 is implemented in deployed application 107, the specifics of connecting first and second Web services can vary depending on the platform and/or operating environment. When deployed within the same data center Web service endpoints can be configured to use TCP. On the other hand, when the first and second Web service are on opposite sides of a firewall, the Web service endpoints can be configured to use a relay connection.

Deployed distributed application programs can provide operational information about execution. For example, during execution distributed application can emit event stream 137 indicative of events (e.g. execution or performance issues) that have occurred at distributed application 107. In one implementation, distributed application 107 sends out event stream 137 on a continuous, ongoing basis, while, in other implementations, distributed application 107 sends event stream 137 on a scheduled basis (e.g., based on a schedule setup by the platform-specific driver 130). Driver 130, in turn, passes event stream 137 to analytics module 110 for analysis, tuning, and/or other appropriate modifications. The events emitted in event stream 137 are defined in declarative application model 153.

Generally, and as will be understood more fully herein, analytics module 110 aggregates, correlates, and otherwise filters data from event stream 137 to identify interesting trends and behaviors of distributed application 107. Analytics module 110 can also automatically adjust the intent of declarative model 153 as appropriate, based on identified trends. For example, analytics module 110 can send model modifications 138 to repository 120 to adjust the intent of declarative model 153. An adjusted intent can reduce the number of messages processed per second at a computer system if the computer system is running low on system memory, redeploy distributed application 107 on another machine if the currently assigned machine is rebooting too frequently, etc.

Figure 1B:
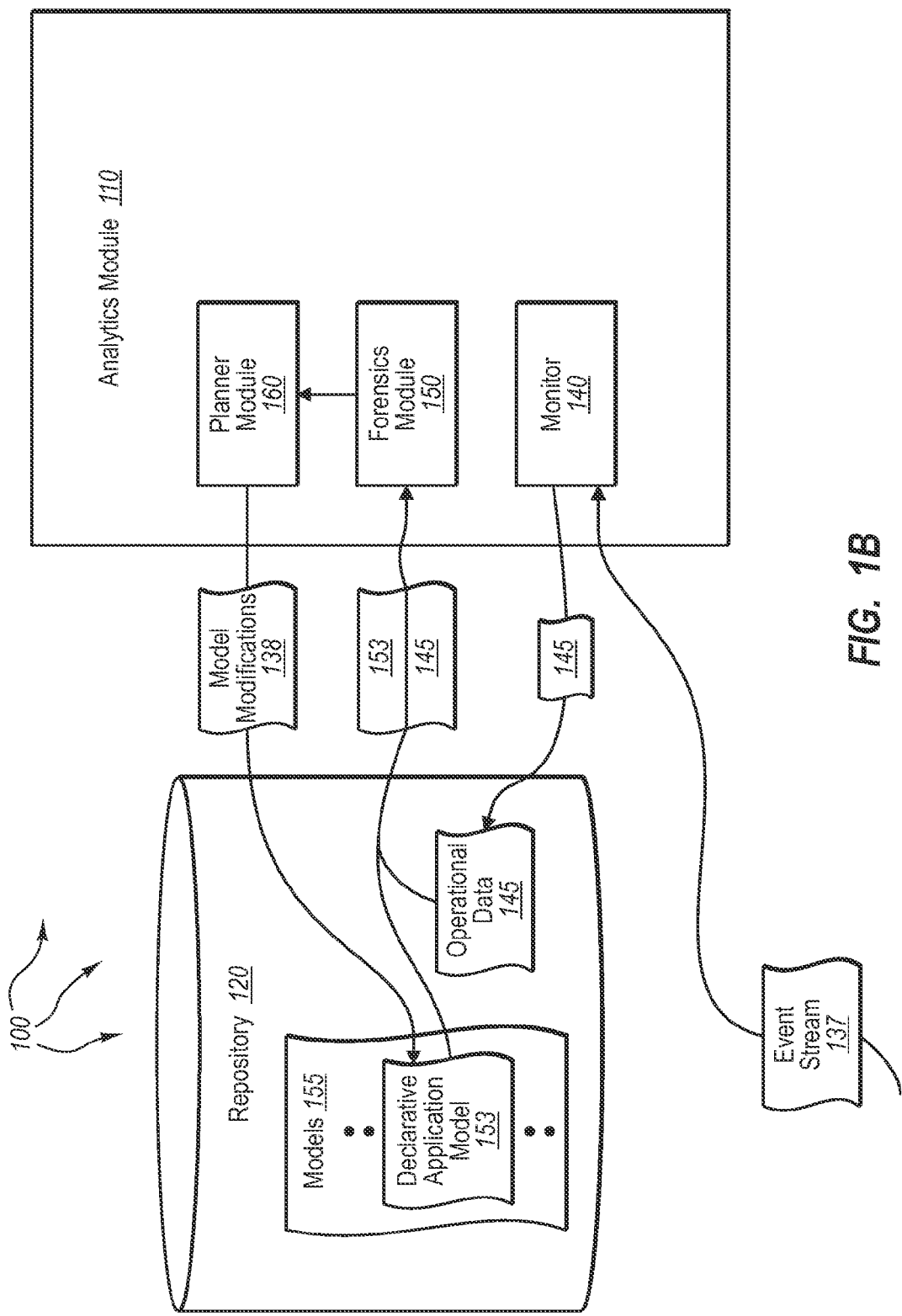

FIG. 1B depicts more detailed view of analytics module 110 and repository 120 within computer architecture 100. As depicted, analytics module 110 includes monitor 140, forensics module 150, and planner module 160. As previously described, analytics module 110 can receive event streams 137 from distributed application 107 (e.g., through driver 130).

In some embodiments, event stream 137 is first received at monitor 140. Monitor 140 normalizes event stream 137, and computes operational data 145. Generally, operational data 145 includes virtually any type of operational information regarding the operation and/or behavior of any module or component of distributed application 107. For example, monitoring component 140 can compute the number of requests served per hour, the average response times, etc. for distributed application 107 (from event stream 137) and include the results of these computations in operational data 145.

To create useful operational data, monitoring component 140 can compare an event stream with the intent of a corresponding declarative model to compute and create useful operational data. In at least one implementation, monitoring component 140 performs join-like filtering of event streams that include real world events with intent information described by a particular declarative model. Accordingly, operational data can include primarily data that is relevant and aggregated to the level of describing a running distributed application (and corresponding modules) and systems around it. For example, monitor 140 can compare events stream 137 to the intent of declarative application model 153 to compute operational data 145 for distributed application 107 (a deployed application based on declarative application model 153). Monitor 140 can then write operational data 145 to repository 120.

Forensics module 150 (e.g., an expert system) is configured to detect trends, pathologies, and their causes in the behavior of running applications (e.g., acceleration of reboot rates cause by a memory leak). Forensics module 150 can access a declarative model and corresponding operational data and logically join information from the operational data to the declarative model intent. Based on the joining forensics module 150 can determine if a distributed application is operating as intended.

For example, forensics module 150 can access declarative application model 153 and corresponding operational data 145 and logically join information from the operational data 145 to the intent of declarative application model 153. Based on the joining, forensics module 150 can determine if a distributed application 107 is operating as intended.

Upon detecting trends, pathologies, etc. and their causes in the behavior of running applications forensics module 150 can pass this information to planner module 160. In general, planner module 160 is an associative expert system that decides how to adjust the intent of declarative models based on behavioral, trend-based, or otherwise environmental actions and/or causes. For example, the planner component 160 may decide upon review of the information received from forensics component 150 to roll back a recent change (e.g., that caused a particular server to reboot very frequently) to a distributed application program.

In order to make determinations about whether or to what extent to adjust the intent of a distributed application program, planner module 160 can employ any number of tools. For example, planner module 160 can apply statistical inferencing and constraint-based optimization techniques. Planner module 160 can also compare potential decisions on a declarative model (e.g., a possible update thereto) to prior decisions made for a declarative model (e.g., a previous update thereto), and measure success rates continuously over time against a Bayesian distribution. Thus, planner module 160 can directly influence operations in a distributed application program at least in part by adjusting the intent of the corresponding declarative model.

For example, based on information from forensics module 150, planner module 160 can identify inappropriate behavior in distributed application 107. Accordingly, planner module 160 can send model modifications 138 to repository 120 to modify the intent of declarative application model 153. For example, it may be that modules of distributed application 107 are causing a particular computer system to restart or reboot frequently. Thus, planner module 160 can send model modifications 138 to roll-back a recent change to declarative application model 153 and eliminate possible memory leaks or change other intended behavior to increase the stability of the computer system. When model modifications 138 are saved, executive module 115 can access the modifications and redeploy a new distributed application to implement the adjusted intent.

Accordingly, FIGS. 1A and 1B (and the corresponding text) illustrate or otherwise describe a number of components, modules, and mechanisms that can be used to automatically manage, adjust, and tune the behavior of deployed distributed applications programs during execution. These component, modules, and mechanisms can provide a powerful framework for applying the principle of system adaptability and autonomics.

Figure 1C:
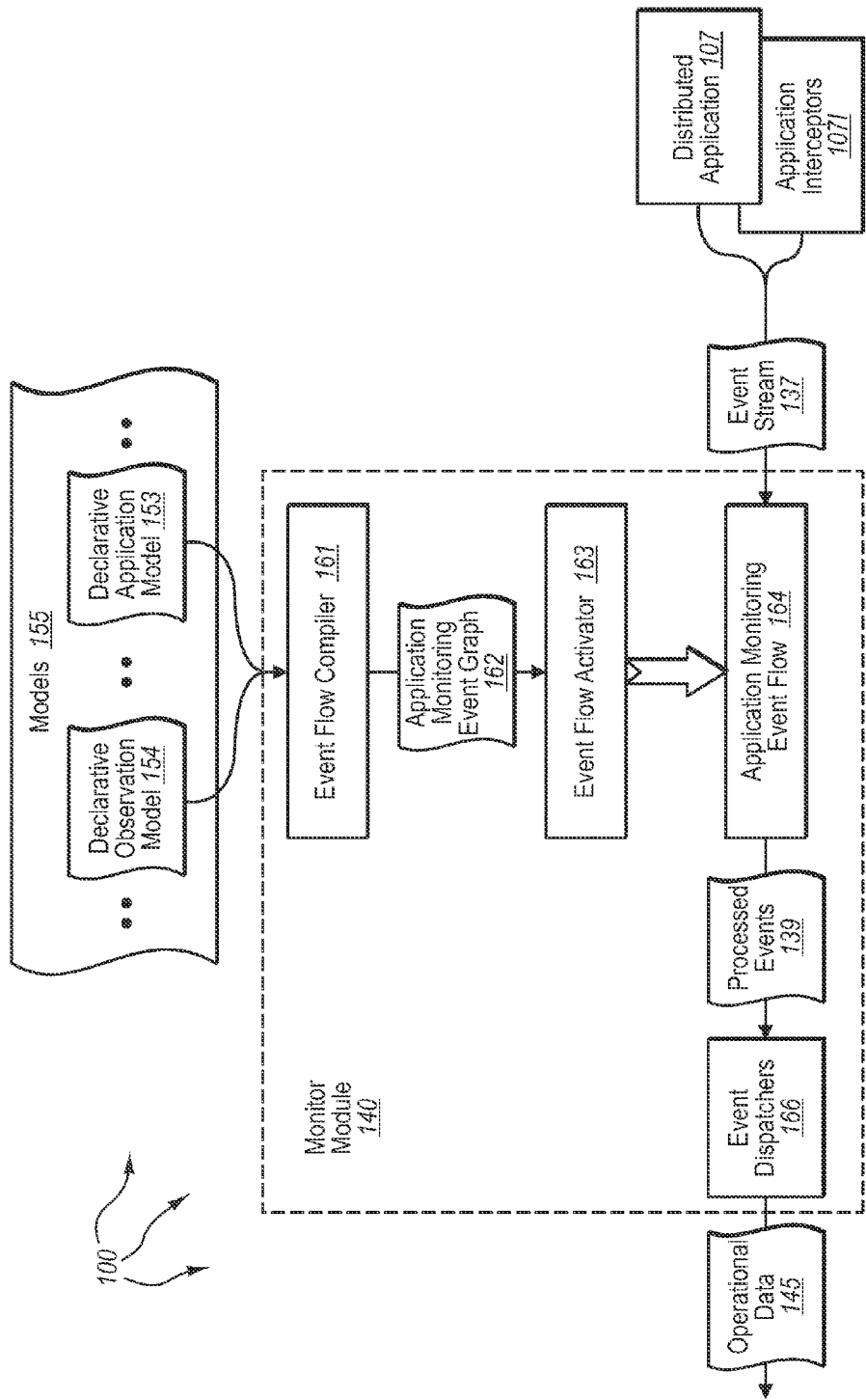

FIG. 1C depicts an expanded view of one embodiment of monitor module 140 and related components within computer architecture 100. Within FIG. 1C, distributed application 107 is deployed and running. Distributed application 107 has corresponding application interceptors 107I. An application interceptor is an instrumented portion of a distributed application configured to emit an event described in a declarative application model. For example, application interceptors 107I can be configured to emit events described in declarative application model 153.

As depicted, models 155, in addition to including declarative application model 153, also includes declarative observation model 154. Declarative observation model describes how events (e.g., from event stream 137) are to be aggregated and processed to produce appropriate operational data (e.g., operational data 145).

Event flow compiler 161 is configured to access a declarative application model and a declarative observation model and compile the declarative application model and the declarative observation model into an event flow graph. The event flow graph includes connected event streams and event operators for appropriate computation of operational data (e.g., computing averages on events coming from many different distributed sources). An event flow graph can account for where events are emitted, where distributed applications are deployed, and where event operators can be placed (e.g., close to the source of an event or closer to the destination of an event). Thus, for example, event flow compiler 161 can compile declarative application model 153 and declarative observation model 154 into application monitoring event graph 162.

Event flow activator 163 is configured to receive and activate an event graph. Event flow activator 163 activates an event graph by configuring appropriate application interceptors and event dispatchers and setting up an active event flow. For example, event flow activator 163 can receive application monitoring event graph 162. Event flow activator 163 can activate application monitoring event graph 162 by configuring application interceptors 107I (e.g., activating only those interceptors that emit events used by event graph application monitoring 162) and event dispatchers 166 and setting up application monitoring event flow 164. One example architecture for configuring application interceptors and event dispatchers is described in more detail below in FIG. 1D.

Application monitoring event flow 164 is configured to receive event stream 137, apply appropriate event operators (from application monitoring event graph 162) to event stream 137, and output processed events 139. Processed events 139 are received at event dispatchers 166, which convert (e.g., filter) processed events 139 into operational data 145.

Figure 1D:
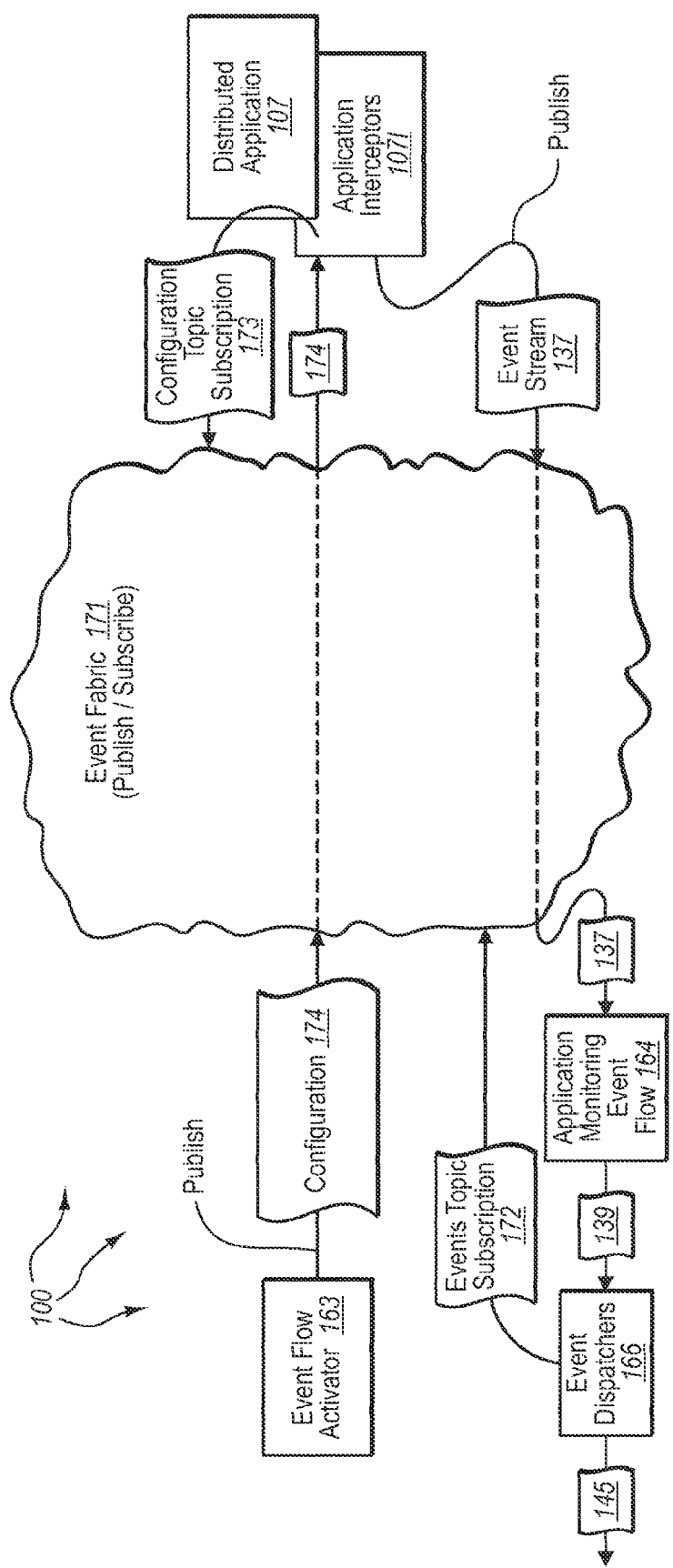

FIG. 1D depicts components for configuring application interceptors and event dispatchers within computer architecture 100. The components of FIG. 1D can be used to dynamically configure application interceptors to emit only events that are appropriate for monitoring a deployed application. As depicted, FIG. 1D includes event fabric 171. Event fabric 171 can be a publish/subscribe messaging fabric. Published messages can be characterized into topics and subscribers can express interest in messages of particular topics.

For example, upon deploying (or even at some later time) distributed application 107 and application interceptors 107I can submit configuration topic subscription 173 to event fabric 171. Configuration topic subscription 173 expresses an interest in receiving any configurations requesting events that application 107 and application interceptors 107I are capable of producing. Event fabric 171 can retain configuration topic subscription 173 and can send any appropriate messages (e.g., messages having a configuration topic related to messages application 107 and/or application interceptors 107I can produce) to application 107 and/or application interceptors 107I respectively.

When event flow activator 163 activates an application monitoring event flow for an event graph, it configures event dispatchers along with publishing the configuration into event fabric 171. Based on event dispatcher configuration, the event dispatchers submit an event topic subscription to event fabric 171. The event topic subscription indicates an intent to receive events for computing appropriate operation data. For example, when event flow activator 163 activates application monitoring event flow 164 from application monitoring event graph 162, it configures event dispatchers 166 along with publishing configuration 174 to the configuration topic within event fabric 171. Event fabric 172 can characterize configuration 174 into a configuration topic indicated in configuration topic subscription 173.

Based on event dispatcher configuration, event dispatchers 166 submit event topic subscription 172 to event fabric 171. Event topic subscription 172 indicates an intent to receive events for computing appropriate operation data for distributed application 107.

Event fabric 171 can determine that application interceptors 107I have expressed an interest in configuration 174 (i.e., configuration 174 is characterized into a configuration topic indicated in configuration topic subscription 173). Accordingly, event fabric 171 can deliver configuration 174 to application interceptors 107I. In response to receiving configuration 174, application interceptors 107I can be configured to emit events in accordance with configuration 174. Emitted events result in event stream 137 being published to the event topic within event fabric 171.

Event fabric 171 can characterize event stream 137 into an event topic indicated in event topic subscription 172. Event fabric 171 can determine that event dispatchers 166 have expressed an interest in event stream 137 (i.e., event stream 137 is characterized into an event topic indicated in event topic subscription 172). Accordingly, event fabric 171 can deliver event stream 137 to application monitoring event flow 164. In response to receiving event stream 137, application monitoring event flow 164 can process event stream 137 into processed events 139. Processed events 139 can be delivered to event dispatchers 166 that compute operational data 145.

Accordingly, embodiments of the invention facilitate application interceptor's use of a reverse subscription. That is, application interceptors subscribe to topics in order to produce information (as opposed to subscribing to topics to receive information).

Figure 1E:
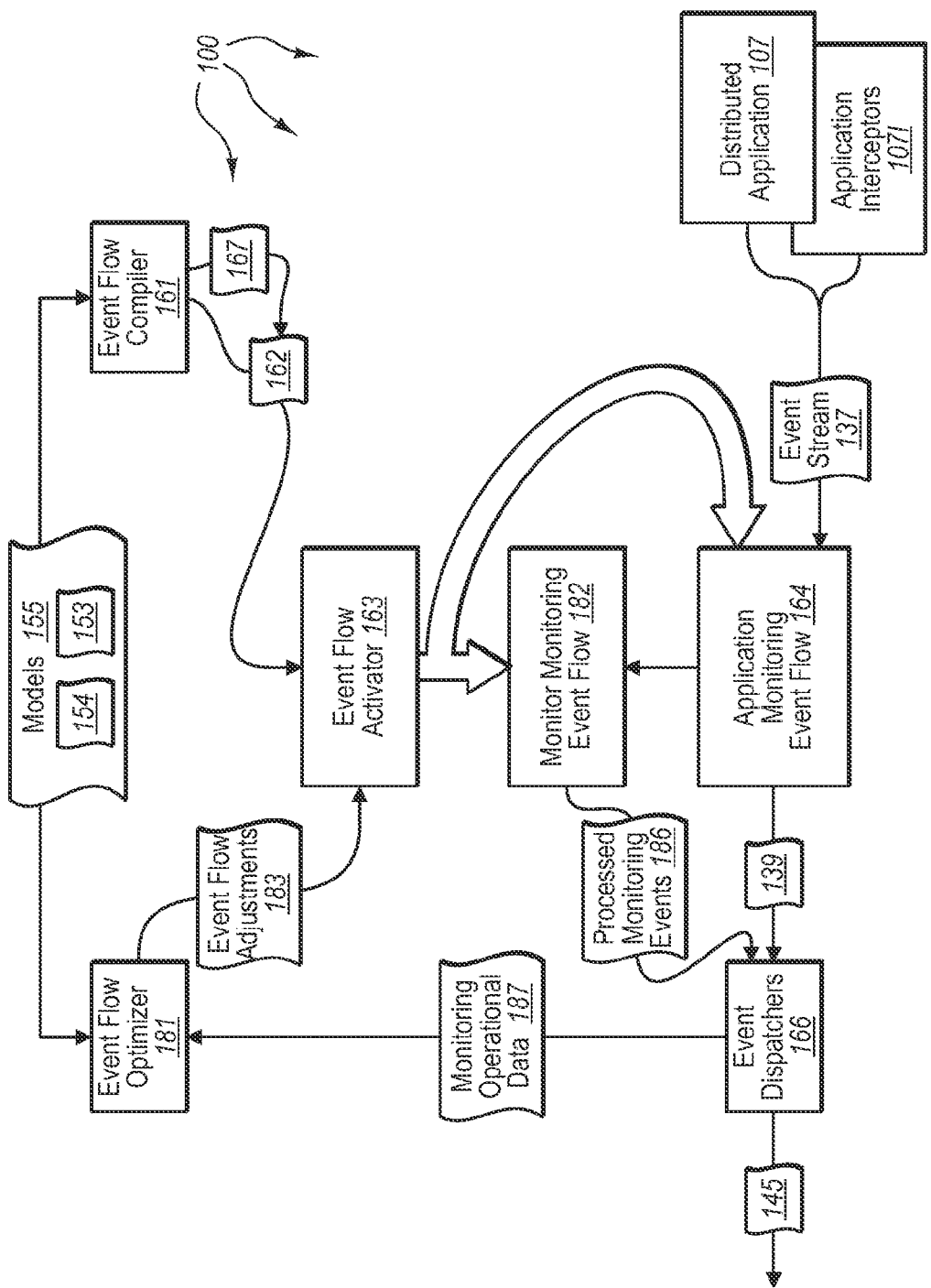

Monitoring of a deployed distributed application can be adjusted to minimize the impact of monitoring on deployed distributed applications. FIG. 1E depicts components for adjusting the impact of monitoring a distributed application within computer architecture 100

As previously described in FIG. 1C, event flow compiler 161 can receive a declarative application model and a declarative observation model from models 155 and compile the declarative application model and the declarative observation model into application monitoring event graph 162. Event flow compiler 161 can add monitor monitoring event flow graph 167 to the application event flow graph Event flow activator 163 can then activate application monitoring event flow 164 as described in FIGS. 1C and/or 1D. Application monitoring event flow 164 can receive event stream 137 from distributed application 107 and/or application interceptors 107I. Application monitoring event flow 164 can output processed events 139 to event dispatchers 166. From processed events 139, event dispatchers 166 can compute operational data 145 (for distributed application 107).

As depicted in FIG. 1E, event flow activator 163 can also activate monitor monitoring event flow 182. Monitor monitoring event flow 182 can include a subset of event streams and event operators that are relevant to monitoring the impact of monitoring distributed application 107 (e.g., event operators that attach to segments of application monitoring event graph 162 and generate metrics around runtime behavior related to monitoring distributed application 107). Application monitoring event flow 164 can send relevant events from event stream 137 to monitoring monitor event flow 182.

From these relevant events, monitoring monitor event flow 182 can generate processed monitoring events 186. Monitor monitoring event flow 182 can output processed monitoring events 186 to event dispatchers 166. From processed monitoring events 186, event dispatchers 166 can create monitoring operational data 187 (e.g., for monitor 140). Event flow optimizer 181 can receive monitoring operational data 187. Based on expressed intent in a declarative application model and declarative observation model (e.g., 153 and 154) and monitoring operational data 187, event flow optimizer 181 can adjust the event flow. Thus, event flow optimizer 181 can send event flow adjustments 183 to event flow activator 163 to adjust the intent of application monitoring event flow 164 and/or monitor monitoring event flow 182. For example, event flow adjustments 183 can move an event operator off an application node and on to an intermediate node in the network or to an event destination node. Further iterative adjustments can be made in a similar fashion.

Accordingly, embodiments of the invention facilitate continuous optimization of event flows to dynamically balance the impact associated with monitoring distributed applications. Continuous optimization allows monitoring to efficiently adjust to varied (and potentially unpredictable) activity patterns in distributed applications.

Figure 2:
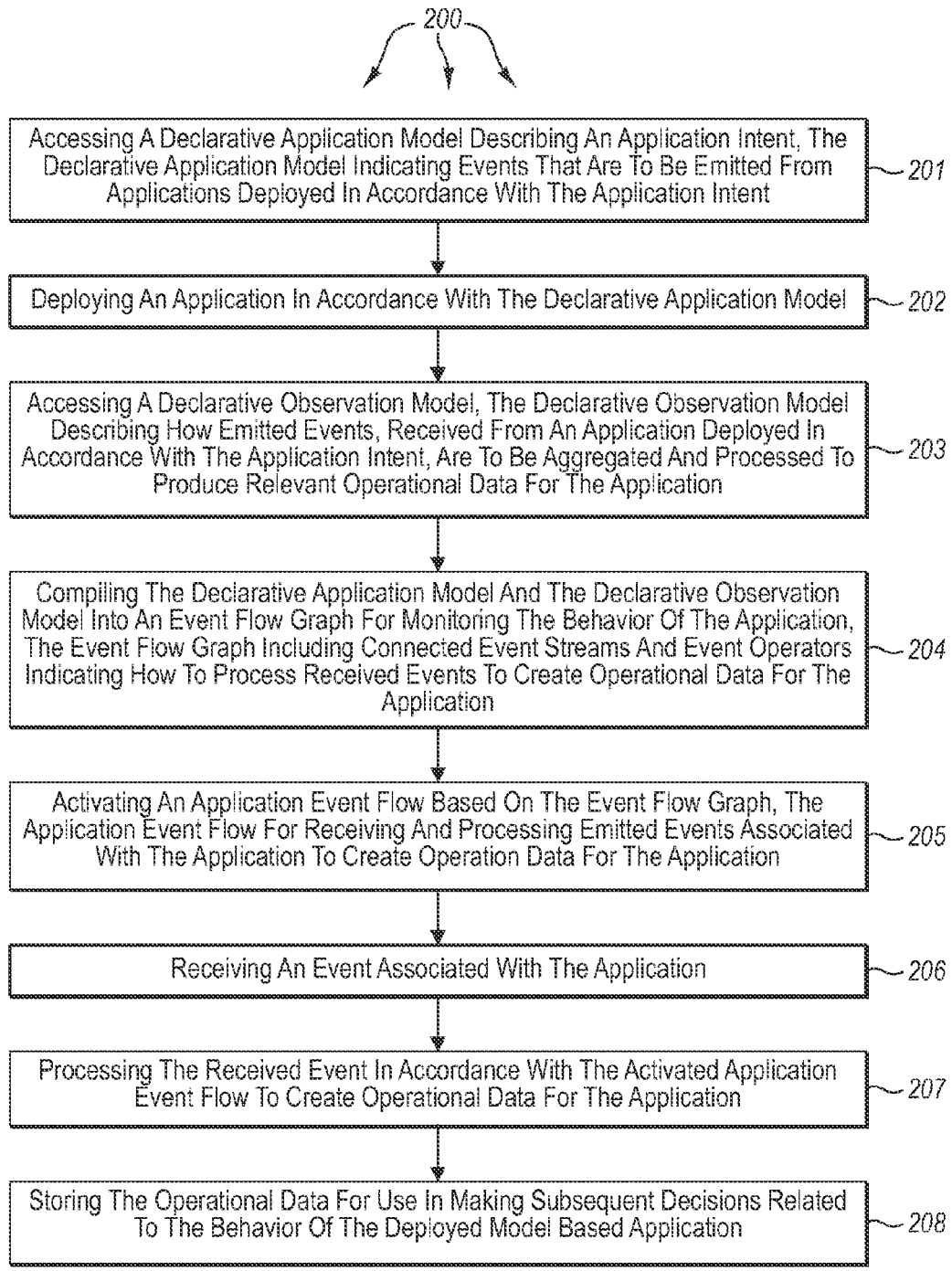
FIG. 2 illustrates a flow chart of an example method for monitoring of a modeled application.

FIG. 2 illustrates a flow chart of an example method 200 for monitoring a modeled application. The method 200 will be described with respect to the data and components depicted in computer architecture 100.

Method 200 includes an act of accessing a declarative application model describing an application intent, the declarative application model indicates events that are to be emitted from applications deployed in accordance with the application intent (act 201). For example, referring to FIG. 1C, event flow compiler 161 can access declarative application model 153. Declarative application model 153 can describe an application intent for a deployed distributed application. Declarative application model 153 can also indicate events that are to be emitted from a deployed distributed application that is deployed to implement the application intent.

Method 200 includes an act of deploying an application in accordance with the declarative application model (act 202). For example, referring briefly back to FIG. 1A, executive module 115 and driver 130 can interoperate to deploy application 107 in accordance with the application intent of declarative application model 153.

Method 200 includes an act of accessing a declarative observation model, the declarative observation model describing how emitted events, received from an application deployed in accordance with the application intent, are to be aggregated and processed to produce relevant operational data for the application (act 203). For example, returning to FIG. 1C, event flow compiler 161 can access declarative observation model 154. Declarative observation model 154 can describe how emitted events in event stream 137 are to be aggregated and processed to produce operational data 145.

Method 200 includes an act of compiling the declarative application model and the declarative observation model into an event flow graph for monitoring the behavior of the application, the event flow graph including connected event streams and event operators indicating how to process received events to create operational data for the deployed application (act 204). For example, event flow compiler 161 can compile declarative application model 153 and declarative observation model 154 into application monitoring event graph 162 for monitoring the behavior of application 107. Application monitoring event graph 162 can include connected event streams and event operators indicate how to process event stream 137 to create operational data 145.

Method 200 includes an act of activating an application event flow based on the event flow graph, the application event flow for receiving and processing emitted events associated with the application to create operation data for the deployed application (act 205). For example, event flow activator 163 can activate application monitoring event flow 164 based on application monitoring event graph 162. Application monitoring event flow 164 can receive and process event stream 137 to create operational data for distributed application 107.

Method 200 includes an act of receiving an event associated with the deployed application (act 206). For example, application monitoring event flow 164 can receive event stream 137. Method 200 includes an act of processing the received event in accordance with the activated application event flow to create operational data for the deployed application (act 207). For example, application monitoring event flow 164 can process event stream 137 in accordance with the connected event streams and event operators in application monitoring event graph 162.

Application monitoring event flow 164 can output processes processed events 139 to event dispatchers 166. Event dispatchers 166 can create operational data 145 from processed events 139. Method 200 includes an act of storing the operational data for use in making subsequent decisions related to the behavior of the deployed model based application (act 208). For example, event dispatchers 166 can store operational data 145 (in repository 120) for use in making subsequent decisions related to the behavior of distributed application 107.

Figure 3:
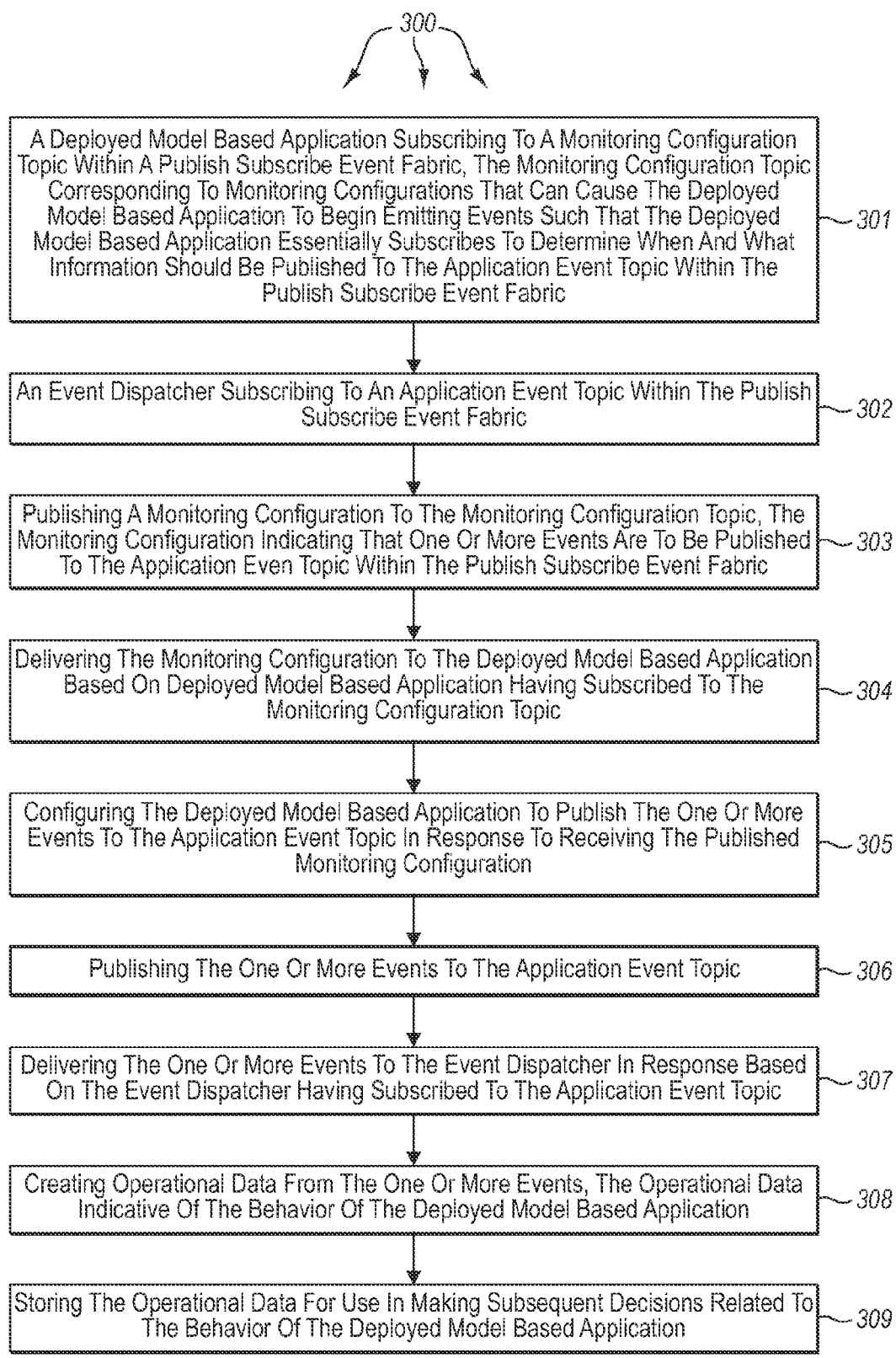
FIG. 3 illustrates a flow chart of an example method for monitoring of a modeled application

FIG. 3 illustrates a flow chart of an example method 300 for monitoring a modeled application. The method 300 will be described with respect to the data and components depicted in computer architecture 100.

Method 300 includes an act of a deployed model based application subscribing to a monitoring configuration topic within a publish/subscribe event fabric, the monitoring configuration topic corresponding to monitoring configurations that can cause the deployed model based application to begin emitting events such that the deployed model based application essentially subscribes to determine when and what information should be published to the application event topic within the publish/subscribe event fabric (act 301). For example, referring to FIG. 1D, application interceptors 107I can submit configuration topic subscription 173 to event fabric 171. Configuration topic subscription 173 can be a subscription expressing an intent to receive configurations characterized as being within a monitoring configuration topic. Configurations within the monitoring configuration topic can indicate events that application interceptors 107I are to produce so that the behavior of application 107 can be monitored. Thus, application interceptors 107I essentially subscribe to emit events into event fabric 171.

Method 300 includes an act of an event dispatcher subscribing to an application event topic within the publish/subscribe event fabric (act 302). For example, event dispatchers 166 can submit event topic description 172 to event fabric 171. Event topic subscription 172 can be a subscription expressing an intent to receive events characterized as being within an application event topic. Events within the application event topic are events used to monitor the behavior of application 107.

Method 300 includes an act of publishing a monitoring configuration to the monitoring configuration topic, the monitoring configuration indicating that one or more events are to be published to the application event topic within the publish/subscribe event fabric (act 304). For example, event flow activator 163 can publish configuration 174 to event fabric 171. Configuration 174 indicates that event stream 137 is to be published to the application event topic within event fabric 171.

Method 300 includes an act of delivering the monitoring configuration to the deployed model based application based on the deployed model based application having subscribed to the monitoring configuration topic (act 304). For example, event fabric 171 can deliver configuration 174 to application interceptors 107I based on application interceptors 107I having subscribed (through configuration topic subscription 173) to the monitoring configuration topic.

Method 300 includes an act of configuring the deployed model based application to publish the one or more events to the application event topic in response to receiving the published monitoring configuration (act 305). For example, application interceptors 107I can be configured to publish event stream 137 to event fabric 171 in response to receiving configuration 174. Method 300 includes an act of publishing the one or more events to the application event topic (act 306). For example, application interceptors 107I can publish event stream 137 to the application event topic.

Method 300 includes an act of delivering the one or more events to the event dispatcher in response to receiving the one or more events based on the event dispatcher having subscribed to the application event topic (act 307). For example, event fabric 171 can deliver event stream 137 to application monitoring event flow 164. Event stream 137 can be delivered in response to receiving event stream 137 based on event dispatchers 166 having subscribed to the application event topic. Application monitoring event flow 164 can process event stream 137 and output processed events 139 that are delivered to event dispatchers 166.

Method 300 includes an act of creating operational data from the one or more events, the operational data indicative of the behavior of the deployed model based application (act 308). For example, event dispatchers 166 can create operational data 145 from processed events 139. Method 300 includes an act of storing the operational data for use in making subsequent decisions related to the behavior of the deployed model based application (act 309). For example, event dispatchers 166 can store operation data 145 (in repository 120) for use in making subsequent decisions related to the behavior of distributed application 107.

Thus an application interceptor's use of reverse subscriptions facilitates dynamic configuration of deployed application monitoring. That is, an application interceptor can subscribe to emit only those events (e.g., some subset of available events) that are requested through a configuration. For example, as monitor 140 is commanded to activate or deactivate observation models, event interception demands can vary. In the absence of a specific failure, observation models for monitoring general application health can be activated. On the other hand, when a failure occurs observation models for root causes of particular failures can be activated.

In some embodiments, one or more acts from method 200 are combined with one or more acts of method 300 to monitor a distributed application in a model based monitoring system that utilizes reverse subscriptions.

Figure 4:
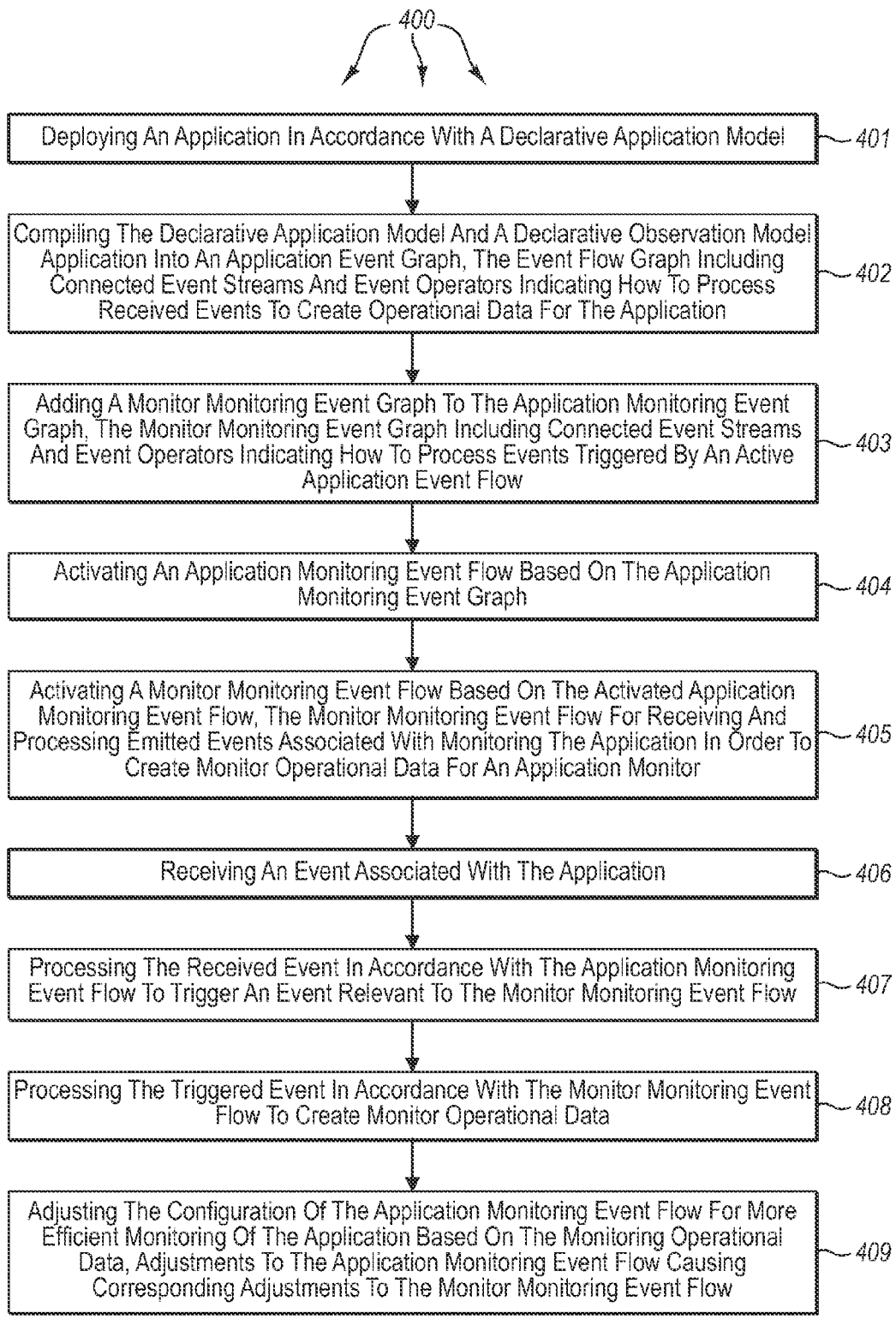
FIG. 4 illustrates a flow chart of an example method for adjusting monitoring of a modeled application.

FIG. 4 illustrates a flow chart of an example method 400 for adjusting the monitoring of a modeled application. The method 400 will be described with respect to the data and components depicted in computer architecture 100.

Method 400 includes an act of deploying an application in accordance with a declarative application model (act 401). For example, referring briefly to FIG. 1A, executive module 115 and driver 130 can interoperate to deploy application 107 in accordance with declarative application model 153.

Method 400 includes an act of compiling the declarative application model and a declarative observation model into an event flow graph, the event flow graph including connected event streams and event operators indicating how to process received events to create operational data for the application (act 402). For example, referring now to FIG. 1E, event flow compiler 161 can compile declarative application model 153 and declarative observation model 154 into application monitoring event graph 162. Application monitoring event graph 162 can include connected event streams and event operators indicating how to process received events to create operational data for distributed application 107.

Method 400 includes an act of adding a monitor monitoring event graph to the application monitoring event graph, the monitor monitoring event graph including connected event streams and event operators indicating how to process events trigged by an active application event flow (act 403). For example, event flow compiler 161 can add monitor monitoring event flow 167 to application monitoring event graph 162. Monitor monitoring event flow 167 can be added to application monitoring event graph 162 based on hints included in declarative application model 153 and/or declarative observation model 154.

Method 400 includes an act of activating an application monitoring event flow based on the application monitoring event graph (act 404). For example, event flow activator 163 can activate application monitoring event flow 164.

Method 400 includes an act of activating a monitor monitoring event flow based on the activated application monitoring event flow, the monitor monitoring event flow for receiving and processing emitted events associated with monitoring the application in order to create monitor operational data (act 405). For example, event flow activator 163 can activate monitor monitoring event flow 182 based on application monitoring event flow 164. Monitor monitoring event flow 182 can receive and process emitted events associated with monitoring distributed application 107 in order to create monitor operational data 187.

In some embodiments, a generalized event flow, including both the application monitoring event flow and monitoring event flow, is activated. Thus the application monitoring event flow and monitoring event flow can be activated essentially simultaneously and included as part of a generalized event flow.

Method 400 includes an act of receiving an event associated with the deployed application (act 406). For example, application monitoring event flow 164 can receive event stream 137. Method 400 includes an act of processing the received event in accordance with the application monitoring event flow to trigger events relevant to the monitor monitoring event flow (act 407). For example, application monitoring event flow 164 can process event stream 137 to trigger events relevant to monitor monitoring event flow, such as, for example, events related to monitoring behavior and monitoring metrics (such as when an event computation starts or completes). Triggered events are forwarded to monitor monitoring event flow 182.

Method 400 includes an act of processing the triggered event in accordance with the monitor monitoring event flow to create monitor operational data for the application monitor (act 408). For example, monitor monitoring event flow 182 can process one or more receive events triggered by application monitoring event flow 164 and output processed monitoring events 186. Event dispatchers 166 can receive processed monitoring events 186 and compute monitoring operation data 187.

Method 400 includes an act of adjusting the configuration of the application monitoring event flow for more efficient monitoring of the deployed application based on the monitoring operational data (act 409). For example, event flow optimizer 181 can access monitoring operational data 187. From monitoring operational data 187, event flow optimizer can formulate event flow adjustments 183. Event flow adjustments 183 indicate to event flow activator 163 how application monitoring event flow 164 (can be adjusted to facilitate more efficient monitoring of distributed application 107 based on current operating environment. For example, event flow adjustments 183 can alter the frequency of executing event operators in application monitoring event graph 162 when usage of distributed application 107 increases (and thus available resources are reduced). Event flow adjustments 183 can also alter where event operators are executed, alter how many event streams are combined, etc.

Adjustments to application monitoring event flow 164 can cause corresponding adjustments to monitor monitoring event flow 182.

One or more acts of method 400 can be combined with one or more acts of method 200 and/or one or more acts of method 300 in a dynamic self-adjusting monitoring system for monitoring distributed applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for monitoring a model based distributed application, the method comprising:
   an act of accessing a declarative application model describing an application intent, the declarative application model indicating events that are to be emitted from applications deployed in accordance with the application intent;
   an act of deploying an application in accordance with the declarative application model;
   an act of accessing a declarative observation model, the declarative observation model describing how emitted events, received from an application deployed in accordance with the application intent, are to be aggregated and processed to produce relevant operational data for the application;
   an act of compiling the declarative application model and the declarative observation model into an event flow graph for monitoring the behavior of the application, the event flow graph including connected event streams and event operators indicating how to process received events to create operational data for the deployed application;
   an act of activating an application event flow based on the event flow graph, the application event flow for receiving and processing emitted events associated with the application to create operational data for the deployed application;
   an act of receiving an event associated with the deployed application;
   an act of processing the received event in accordance with the activated application event flow to create operational data for the deployed application; and
   an act of storing the operational data for use in making subsequent decisions related to the behavior of the deployed application.

2. The method as recited in claim 1, wherein the act activating an application event flow based on the event flow graph comprises activating an application event flow to create operational data indicative of the behavior of the deployed application.

3. The method as recited in claim 1, further comprising prior to activating the application monitoring event flow:
   an act of the deployed application subscribing to a monitoring configuration topic within a publish/subscribe event fabric, the monitoring configuration topic corresponding to monitoring configurations that can cause the deployed application to begin emitting events such that the deployed application essentially subscribes to publish information into the publish/subscribe event fabric;
   an act of the publish/subscribe event fabric delivering a monitoring configuration to the deployed application based on the deployed application having subscribed to the monitoring configuration topic; and
   an act of the deployed application emitting events to the application event topic based on the configuration received on the configuration event topic.

4. The method as recited in claim 1, further comprising:
   an act of accessing the stored operational data; and
   an act of comparing the operational data to an application intent expressed in the declarative application model to determine if the deployed application is operating as intended.

5. The method as recited in claim 4, further comprising:
   an act of determining based on the comparison that the deployed application is not operating in accordance with the application intent; and
   an act of modifying the declarative application model to cause any re-deployed application based on the modified declarative application model to more closely approach the application intent.

6. The method as recited in claim 1, wherein the act of compiling the declarative application model and the declarative observation model into an event flow graph comprises compiling the declarative application model and the declarative observation model into an event flow graph that indicates one or more of: a frequency of executing event operators, where event operators are to be executed, and how many event streams are to be combined to generate operation data for the deployed application.

7. A computer program product for use at a computer system, the computer program product for implementing a method for monitoring a model based distributed application, the computer program product comprising one or more computer readable storage devices having stored thereon computer-executable instructions that, when executed at a processor, cause the computer system to perform the method, including the following:
   access a declarative application model describing an application intent, the declarative application model indicating events that are to be emitted from applications deployed in accordance with the application intent;
   access a declarative observation model, the declarative observation model describing how emitted events, received from applications deployed in accordance with the application intent, are to be aggregated and processed to produce relevant operational data for applications deployed in accordance with the application intent;
   compile the declarative application model and the declarative observation model into an event flow graph for monitoring the behavior of applications deployed in accordance with the application intent, the event flow graph including connected event streams and event operators indicating how to process received events to create the relevant operational data;
   activate an application event flow based on the event flow graph, the application event flow for receiving and processing emitted events associated with applications deployed in accordance with the application intent to create the relevant operational data;
   receive an event associated with a deployed application, the deployed application having been deployed in accordance with the declarative application model;
   process the received event in accordance with the activated application event flow to create operational data for the deployed application; and
   store the operational data for use in making subsequent decisions related to the behavior of the deployed application.

8. The computer program product as recited in claim 7, wherein computer-executable instructions that, when executed, cause the computer system to activate an application event flow based on the event flow graph comprise computer-executable instructions that, when executed, cause the computer system to activate an application event flow to create relevant operational data indicative of the behavior of applications deployed in accordance with the application intent.

9. The computer program product as recited in claim 7, further comprising computer-executable instructions that, when executed, cause the computer system to:
subscribe to a monitoring configuration topic within a publish/subscribe event fabric, the monitoring configuration topic corresponding to monitoring configurations that can cause the deployed application to begin emitting events such that the deployed application essentially subscribes to publish information into the publish/subscribe event fabric;
deliver a monitoring configuration to the deployed application based on the deployed application having subscribed to the monitoring configuration topic; and
emit events to the application event topic based on the configuration received on the configuration event topic.

10. The computer program product as recited in claim 7, further comprising computer-executable instructions that, when executed, cause the computer system to:
access the stored operational data; and
compare the operational data to the application intent to determine if the deployed application is operating as intended.

11. The computer program product as recited in claim 10, further comprising computer-executable instructions that, when executed, cause the computer system to:
determine based on the comparison that the deployed application is not operating in accordance with the application intent; and
modify the declarative application model to cause any re-deployed application based on the modified declarative application model to more closely approach the application intent.

12. The computer program product as recited in claim 7, wherein computer-executable instructions that, when executed, cause the computer system to compile the declarative application model and the declarative observation model into an event flow graph comprise computer-executable instructions that, when executed, cause the computer system to compile the declarative application model and the declarative observation model into an event flow graph that indicates one or more of: a frequency of executing event operators, where event operators are to be executed, and how many event streams are to be combined to generate operation data for the deployed application.

13. A system, the system comprising:
one or more processors;
system memory; and
a monitoring module for monitoring deployed applications, monitoring including:
accessing a declarative application model describing an application intent, the declarative application model indicating events that are to be emitted from applications deployed in accordance with the application intent;
accessing a declarative observation model, the declarative observation model describing how emitted events, received from applications deployed in accordance with the application intent, are to be aggregated and processed to produce relevant operational data for applications deployed in accordance with the application intent;
compiling the declarative application model and the declarative observation model into an event flow graph for monitoring the behavior of applications deployed in accordance with the application intent, the event flow graph including connected event streams and event operators indicating how to process received events to create the relevant operational data;
activating an application event flow based on the event flow graph, the application event flow for receiving and processing emitted events associated with applications deployed in accordance with the application intent to create the relevant operational data;
receiving an event associated with a deployed application, the deployed application having been deployed in accordance with the declarative application model;
processing the received event in accordance with the activated application event flow to create operational data for the deployed application; and
storing the operational data for use in making subsequent decisions related to the behavior of the deployed application.

14. The system as recited in claim 13, wherein activating an application event flow based on the event flow graph comprises activating an application event flow to create relevant operational data indicative of the behavior of applications deployed in accordance with the application intent.

15. The system as recited in claim 13, wherein monitoring further includes:
subscribing to a monitoring configuration topic within a publish/subscribe event fabric, the monitoring configuration topic corresponding to monitoring configurations that can cause the deployed application to begin emitting events such that the deployed application essentially subscribes to publish information into the publish/subscribe event fabric;
delivering a monitoring configuration to the deployed application based on the deployed application having subscribed to the monitoring configuration topic; and
emitting events to the application event topic based on the configuration received on the configuration event topic.

16. The system as recited in claim 13, wherein monitoring further includes:
accessing the stored operational data; and
comparing the operational data to the application intent to determine if the deployed application is operating as intended.

17. The system as recited in claim 16, wherein monitoring further includes:
determining based on the comparison that the deployed application is not operating in accordance with the application intent; and
modifying the declarative application model to cause any re-deployed application based on the modified declarative application model to more closely approach the application intent.

18. The system as recited in claim 13, wherein compiling the declarative application model and the declarative observation model into an event flow graph comprises compiling the declarative application model and the declarative observation model into an event flow graph that indicates one or more of: a frequency of executing event operators, where event operators are to be executed, and how many event streams are to be combined to generate operation data for the deployed application.

* * * * *